(12) United States Patent
Van Horne

(10) Patent No.: US 9,693,600 B1
(45) Date of Patent: Jul. 4, 2017

(54) PROTECTIVE GOALIE SKATE BOOT BODY WITH INTEGRAL BLADE MOUNTING CHANNEL

(71) Applicant: Scott Van Horne, Winnipeg (CA)

(72) Inventor: Scott Van Horne, Winnipeg (CA)

(73) Assignee: VH FOOTWEAR INC., Winnipeg, Manitoba (CA)

( * ) Notice: Subject to any disclaimer, the term of this patent is extended or adjusted under 35 U.S.C. 154(b) by 0 days.

(21) Appl. No.: 15/087,213

(22) Filed: Mar. 31, 2016

(51) Int. Cl.
| | |
|---|---|
| A63C 1/02 | (2006.01) |
| A43B 5/16 | (2006.01) |
| A43D 3/02 | (2006.01) |
| A43B 1/14 | (2006.01) |
| A43B 23/08 | (2006.01) |
| A43C 5/00 | (2006.01) |
| A43B 23/26 | (2006.01) |
| A63C 1/42 | (2006.01) |
| B29D 35/02 | (2010.01) |
| B29K 105/06 | (2006.01) |
| B29K 307/04 | (2006.01) |

(52) U.S. Cl.
CPC ............ *A43B 5/1683* (2013.01); *A43B 1/14* (2013.01); *A43B 5/1641* (2013.01); *A43B 23/087* (2013.01); *A43B 23/26* (2013.01); *A43C 5/00* (2013.01); *A43D 3/02* (2013.01); *A63C 1/02* (2013.01); *A63C 1/42* (2013.01); *B29D 35/02* (2013.01); *B29K 2105/06* (2013.01); *B29K 2307/04* (2013.01)

(58) Field of Classification Search
CPC ........ A43B 5/1683; A43B 5/1641; A43B 5/16; A43B 5/1625; A63C 1/00; A63C 1/02; A63C 1/42
See application file for complete search history.

(56) References Cited

U.S. PATENT DOCUMENTS

| D526,474 S | 8/2006 | Labonte | |
|---|---|---|---|
| D542,520 S | 5/2007 | Labonte | |
| 7,793,947 B2 | 9/2010 | Labonte | |
| D641,060 S | 7/2011 | Boucher et al. | |
| 8,109,536 B2 | 2/2012 | Labonte | |
| 8,387,286 B2 * | 3/2013 | Koyess | A43B 5/1616 12/142 R |
| 8,684,368 B2 * | 4/2014 | Van Horne | A43B 5/1691 280/11.12 |

(Continued)

*Primary Examiner* — Brian Swenson
(74) *Attorney, Agent, or Firm* — Ryan W. Dupuis; Kyle R. Satterthwaite; Ade & Company Inc.

(57) ABSTRACT

A goalie skate assembly has i) a plastic blade mounting member adapted to releasably receive a metal skate blade therein, and ii) a monocoque carbon fiber and resin composite skate boot body for receiving a foot of the user therein. The unitary structure of the skate boot body includes i) a sole portion, ii) a heel portion extending upwardly from the sole portion for receiving a heel of the user therein, iii) a pair of side portions extending upwardly from opposing sides of the sole portion, and iv) a lower portion extending downwardly from a bottom side of the sole portion so as to surround at least a portion of the blade mounting member. A toe cap mounted on the skate boot body includes a molded plastic outer shell and a liner formed of a fiber and resin composite material bonded to an inner surface of the outer shell.

20 Claims, 8 Drawing Sheets

(56) References Cited

U.S. PATENT DOCUMENTS

| | | | |
|---|---|---|---|
| 2003/0196351 A1* | 10/2003 | Hipp | A43B 3/20 36/72 R |
| 2005/0134010 A1 | 6/2005 | Blankenburg et al. | |
| 2008/0238006 A1* | 10/2008 | Labonte | A43B 5/1666 280/11.12 |
| 2008/0252061 A1* | 10/2008 | Demmers | A43B 5/0415 280/811 |
| 2009/0289427 A1* | 11/2009 | Lovejoy | A43B 5/1641 280/11.12 |
| 2014/0097583 A1 | 4/2014 | Vaughn | |
| 2014/0259794 A1* | 9/2014 | Labonte | A43B 5/16 36/115 |
| 2016/0114239 A1* | 4/2016 | Davis | A63C 1/303 280/11.12 |

* cited by examiner

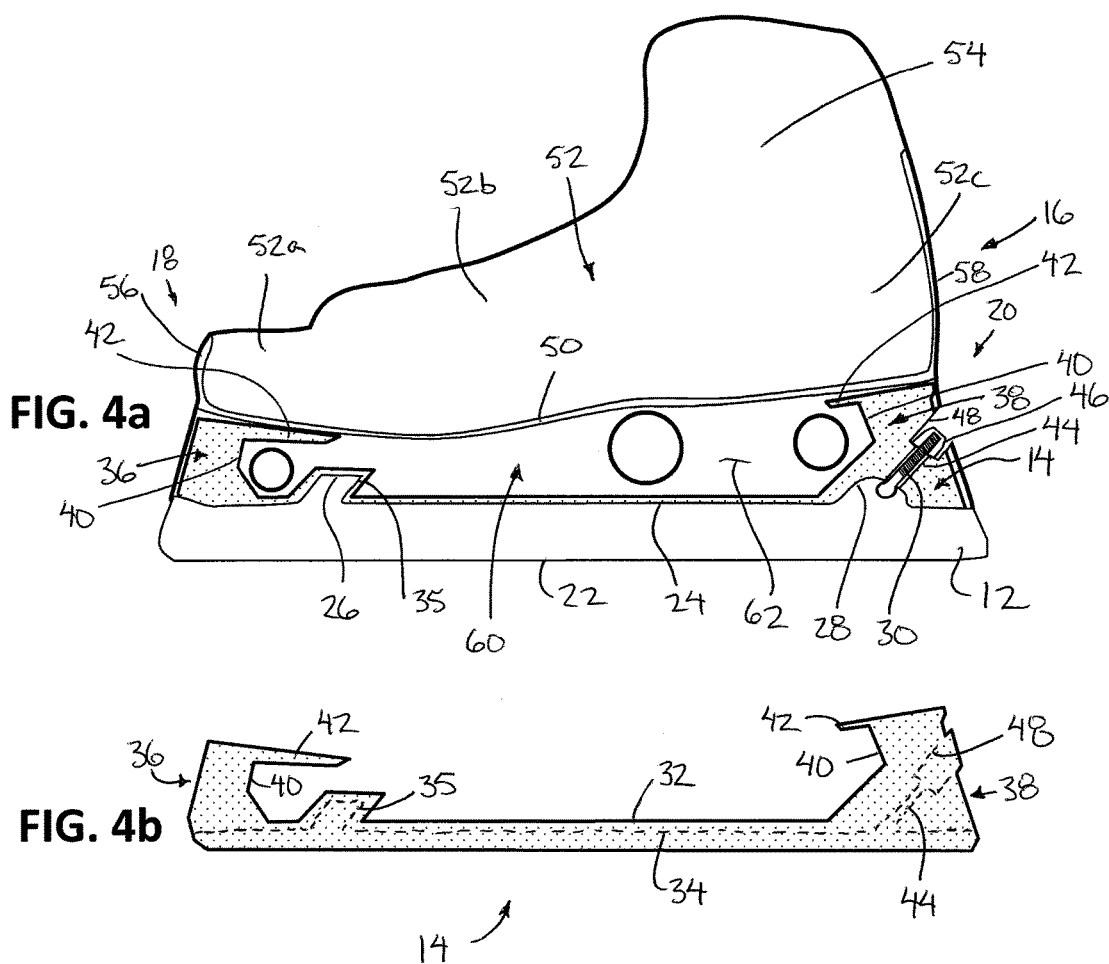

PROTECTIVE GOALIE SKATE BOOT BODY WITH INTEGRAL BLADE MOUNTING CHANNEL

FIELD OF THE INVENTION

The present invention relates to an ice skate used in the sport of hockey, and more particularly, the present invention relates to a skate used by a hockey goalie in which i) the skate boot body is formed to be sufficiently rigid to provide puck impact protection without requiring a separate protective shell or cowling to be mounted externally on the skate boot body, ii) the skate boot body integrally supports a blade receiving channel thereon, and/or iii) a toe cap of the skate boot is formed of molded plastic, subsequently lined with a composite fibre and resin material.

BACKGROUND

In ice hockey there are typically two main positions: goalie and player. The player carries the hockey puck throughout the ice surface, which requires a skate that allows for acceleration, top end speed, tight turning, and fast stopping. The goalie, on the other hand, protects their net from hockey pucks passing the goal line, and therefore does not venture far from the net. A goalie requires a skate that allows very quick side to side movement, and mobility while down on the ice, in the butterfly position.

Traditional goalie skates have a thermoformed plastic boot riveted to a plastic cowling which houses the steel skate blade. The deficiency with this design is threefold:

i) The thermoformed plastic boot does not provide an adequately rigid coupling to the skate blade through the riveted plastic cowling. Therefore, as the goalie attempts to make quick movements from one side of their goalie crease to the other energy, and the resulting movement velocity, is lost through flexing and bending of the traditional goalie skate.

ii) The plastic cowling that is traditionally used covers and encloses the bottom half of the thermoformed plastic boot. Therefore, the cowling creates a larger outer dimension of the skate, which inhibits the goalie's movement when down in the butterfly position because the goalie must create a higher angle between their leg and the ice before the blade can engage the ice and allow the goalie the ability to push.

iii) Because the plastic cowling encloses the bottom half of the boot there is not the ability for the boot position, relative to the plastic cowling and blade, to be modified and optimized.

Various goalie skates are described in the following prior US patent documents: U.S. Pat. Nos. 8,109,536; D641,060; 7,793,947; D542,520; D526,474; 2014/0097583; and 2005/0134010; however, in each instance the protective cowling is formed separately from the skate boot body and subsequently attached to the skate boot body so as to inhibit the goalie's movement in the same manner described above.

SUMMARY OF THE INVENTION

According to one aspect of the invention there is provided a goalie skate assembly for use with a metal skate blade, the assembly comprising:

a blade mounting member formed of a first material having a bottom groove formed therein which is adapted to releasably receive the metal skate blade therein; and a skate boot body formed of a second material different than the first material, the skate boot body comprising a sole portion extending longitudinally between a heel end and a toe end for receiving a foot of a user thereon, a heel portion extending upwardly from the sole portion for receiving a heel of the user therein, a pair of side portions extending upwardly from opposing longitudinally extending sides of the sole portion for receiving a portion of the foot of the user therebetween, and a lower portion extending downwardly from the sole portion so as to surround at least a portion of the blade mounting member;

wherein the lower portion, the sole portion, the heel portion and the side portions of the skate boot body comprise a unitary, monocoque structure integrally formed of the second material.

Preferably the first material of the blade mounting member comprises plastic material. and the second material of the skate boot body comprises a fibre and resin composite material, for example carbon fibres.

The current invention solves the above described limitations of the traditional goalie skate by eliminating the plastic cowling completely. The current invention is a one-piece goalie skate, with a support structure that is constructed from carbon fiber. In one embodiment of the current invention the blade is housed in a plastic channel that is encased in carbon fiber. In a preferred embodiment the structure of the one-piece goalie skate is constructed in one step: the single step carbon fiber wet layup process when cured forms the main structure of the boot and the blade housing. This rigid one-piece connection between the boot and blade housing eliminates the flexing and bending that occurs during the use of a traditional goalie skate. The composite materials used in the support structure of the boot portion of the current invention, and within the toe cap portion of the current invention provides for a more protective boot then what is traditionally found with a goalie skate, and therefore a protective outer plastic cowling is not required. Because an outer plastic cowling is not required the overall width of the current invention is much less than a traditional goalie skate, and this reduced width allows for a smaller angle between the goalie's leg and the ice before the blade can engage the ice and allow the goalie the ability to push. Therefore, the push can be engaged quicker because the goalie doesn't have to lift their leg as high. The blade holder component that houses the blade, that is encased in composite material in the finished skate, can be freely positioned on the foot last prior to the carbon fiber lay-up. Therefore, the current invention allows the position of the blade to be modified and optimized with respect to the foot during the fabrication process.

When the blade mounting member includes a channel portion spanning a full length of the blade mounting member which locates the bottom groove therein and a pair of support columns extending upwardly from the channel portion at longitudinally spaced positions towards the sole portion, preferably at least a portion of the support columns are surrounded by the second material of the skate boot body.

When the skate boot body includes an integral liner bonded to an inner surface thereof, the support columns are preferably abutted at respective upper ends with the integral liner of the skate boot body prior to application of the skate boot body material to the liner and the blade mounting member.

Preferably the blade mounting member is structurally supported relative to the skate boot body solely by the second material of the lower portion of the skate boot body surrounding said at least a portion of the blade mounting member.

The skate boot body preferably also includes two ankle portions for spanning over respective ankles of the foot of the user. The side portions of the skate boot body preferably also include respective forward portions extending upwardly from the opposing longitudinally extending sides of the sole portion at the toe end of the sole portion for being overlapped by a subsequently attached toe cap.

Preferably the goalie skate assembly further comprises a toe cap including an outer shell having a pair of upright side portions at the opposing longitudinally extending sides of the sole portion, a front portion joined between the side portions to extend upwardly from the toe end of the sole portion, and an upper portion joined between the side portions at a location spaced above the sole portion so as to define a toe box for receiving toes of the foot of the user therein.

Preferably the outer shell is formed of plastic material and further includes a liner formed of a fibre and resin composite material bonded to at least a portion of an inner surface of the outer shell. Preferably the liner is bonded to the inner surface of at least a section of each of the side portions, the front portion and the upper portion of the toe cap. The liner of the toe cap preferably also overlaps a portion of an exterior side of each side portion of the skate boot body at each of the opposing longitudinally extending sides of the sole portion.

According to a second aspect of the present invention there is provided a skate assembly comprising:

a skate boot body including a sole portion extending longitudinally between a heel end and a toe end for receiving a foot of a user thereon, a heel portion extending upwardly from the sole portion for receiving a heel of the user therein, pair of side portions extending upwardly from opposing longitudinally extending sides of the sole portion for receiving a portion of the foot of the user therebetween;

a blade mounting member extending downwardly from the sole portion which is adapted to mount a skate blade therein; and a toe cap mounted on the toe end of the skate boot body comprising an outer shell formed of molded plastic and a liner formed of a fibre and resin composite material bonded to at least a portion of an inner surface of the outer shell.

The plastic outer toe cap has resiliency, but is protectively re-enforced by the carbon fiber piece bonded to the inner surface.

When the outer shell of the toe cap includes a pair of upright side portions at the opposing longitudinally extending sides of the sole portion, a front portion joined between the side portions to extend upwardly from the toe end of the sole portion, and an upper portion joined between the side portions at a location spaced above the sole portion so as to define a toe box for receiving toes of the foot of the user therein, preferably the liner is bonded to the inner surface of at least a section of each of the side portions, the front portion and the upper portion of the toe cap.

When the sole portion, the heel portion and the side portions of the skate boot body comprise a unitary, monocoque structure integrally formed of a fibre and resin composite material, preferably the liner of the toe cap overlaps a portion of an exterior side of each side portion of the skate boot body at each of the opposing longitudinally extending sides of the sole portion.

According to a third aspect of the present invention there is provided a method of fabricating a skate boot body for a skate boot in which the skate boot body includes a sole portion extending longitudinally between a heel end and a toe end for receiving a foot of a user thereon, a heel portion extending upwardly from the sole portion for receiving a heel of the user therein, pair of side portions extending upwardly from opposing longitudinally extending sides of the sole portion for receiving a portion of the foot of the user therebetween, wherein the sole portion, the heel portion and the side portions of the skate boot body are integrally formed with one another as a unitary, monocoque structure, the method comprising:

(a) providing a foot last;
(b) positioning a cushioning liner, adapted to cushion the foot of the wearer in the skate boot body, on the foot last;
(c) positioning a blade mounting member, having a bottom groove formed therein which is adapted to releasably receive a metal skate blade therein, on a bottom side of the liner portion;
(d) layering wet composite material over said liner portion and over said blade mounting member; and
(e) vacuum bagging and heating the wet composite material until the wet composite material has cured into a rigid composite structure matrix defining the unitary, monocoque structure of the skate boot body with said liner portion and said blade mounting member integrated therein.

The method preferably further includes re-positioning the blade mounting member relative to the foot last according to a preference of the user, prior to the wet layup process described above.

Preferably the blade mounting member is formed of plastic material.

The method may further include forming a toe cap by molding an outer shell of the toe cap of plastic material and subsequently lining the outer shell with a liner formed of fibre and resin composite material.

The toe cap is preferably mounted onto the toe end of the skate boot body such that the liner of the toe cap overlaps an exterior side of each side portion of the skate boot body at each of the opposing longitudinally extending sides of the sole portion.

One embodiment of the invention will now be described in conjunction with the accompanying drawings in which:

BRIEF DESCRIPTION OF THE DRAWINGS

FIG. 4a is a longitudinal cross-section of the goalie skate assembly;
FIG. 4b is a side view of the blade mounting member.

DETAILED DESCRIPTION

Figure 1:
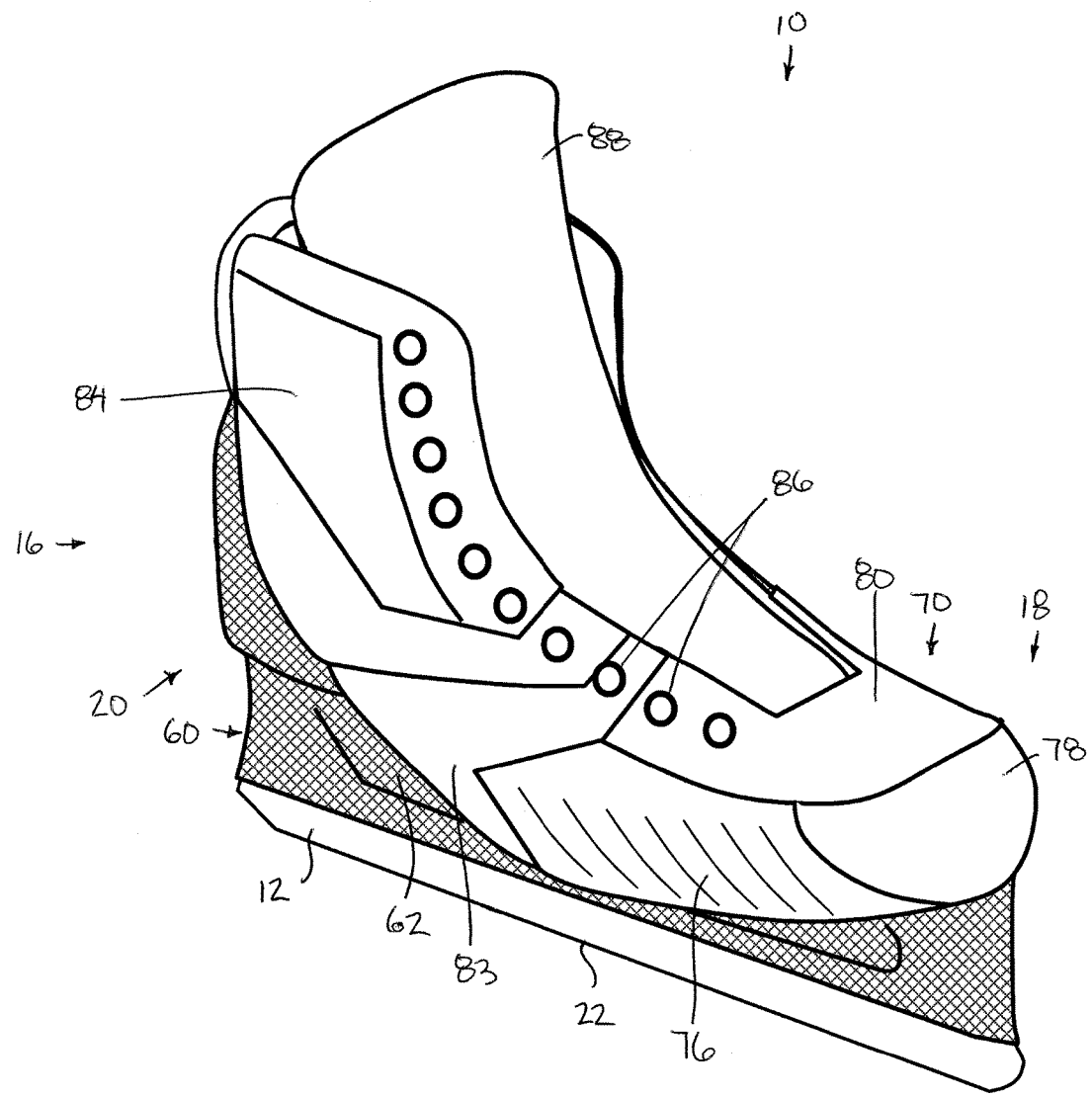
FIG. 1 is a perspective view of the goalie skate assembly.
Figure 2:
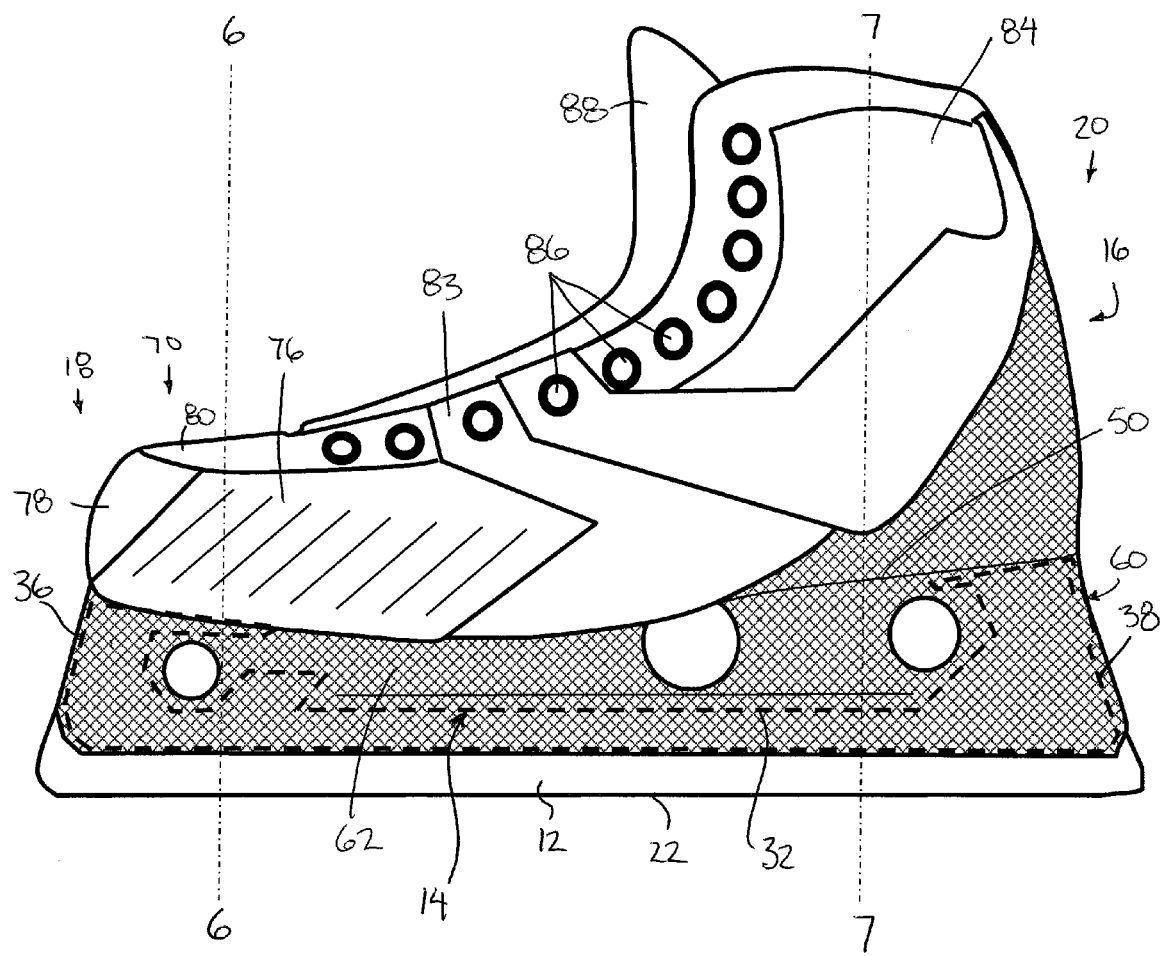
FIG. 2 is a side view of the goalie skate assembly.
Figure 3:
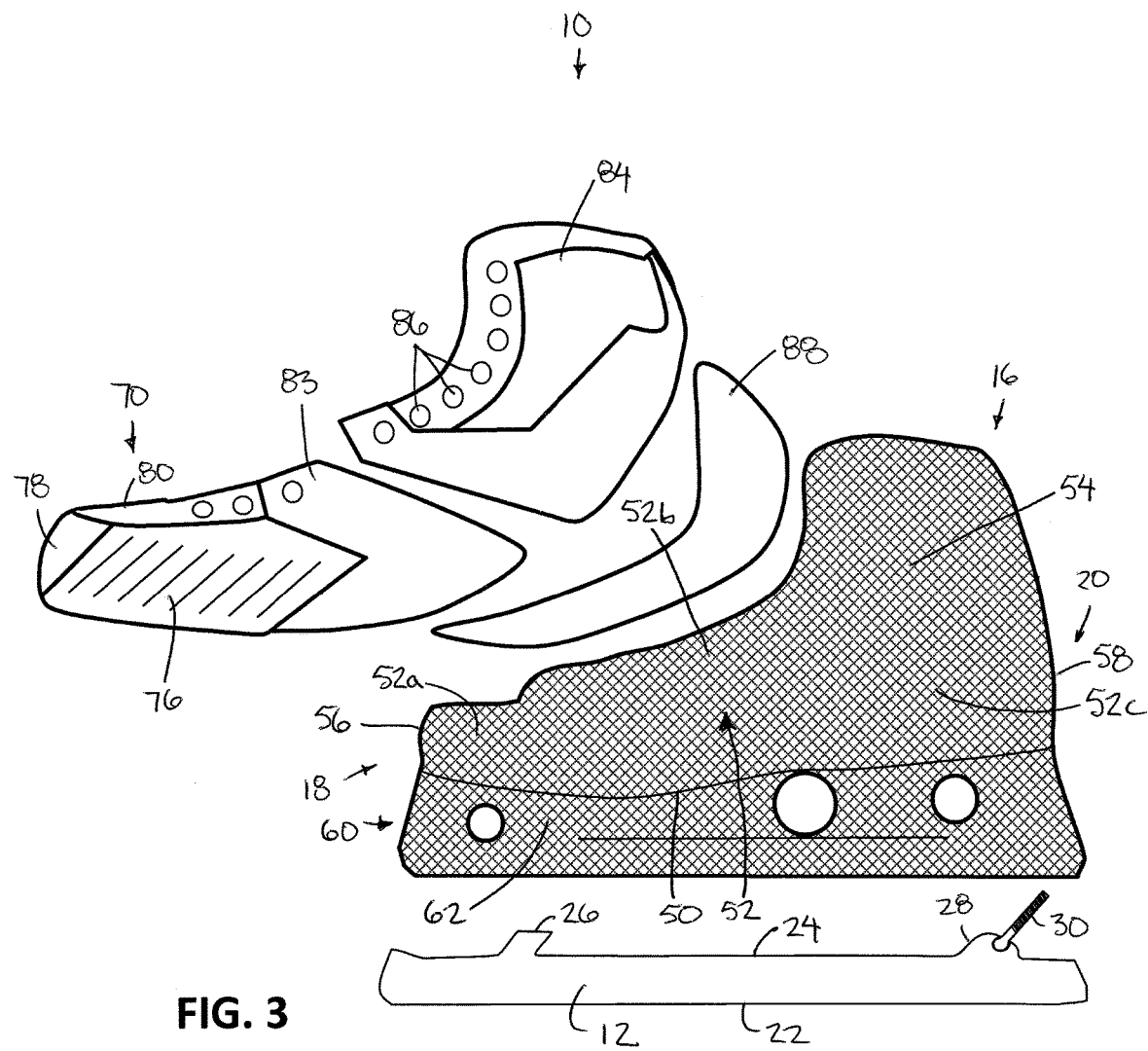
FIG. 3 is an exploded side view of the goalie skate assembly.
Figure 4C:
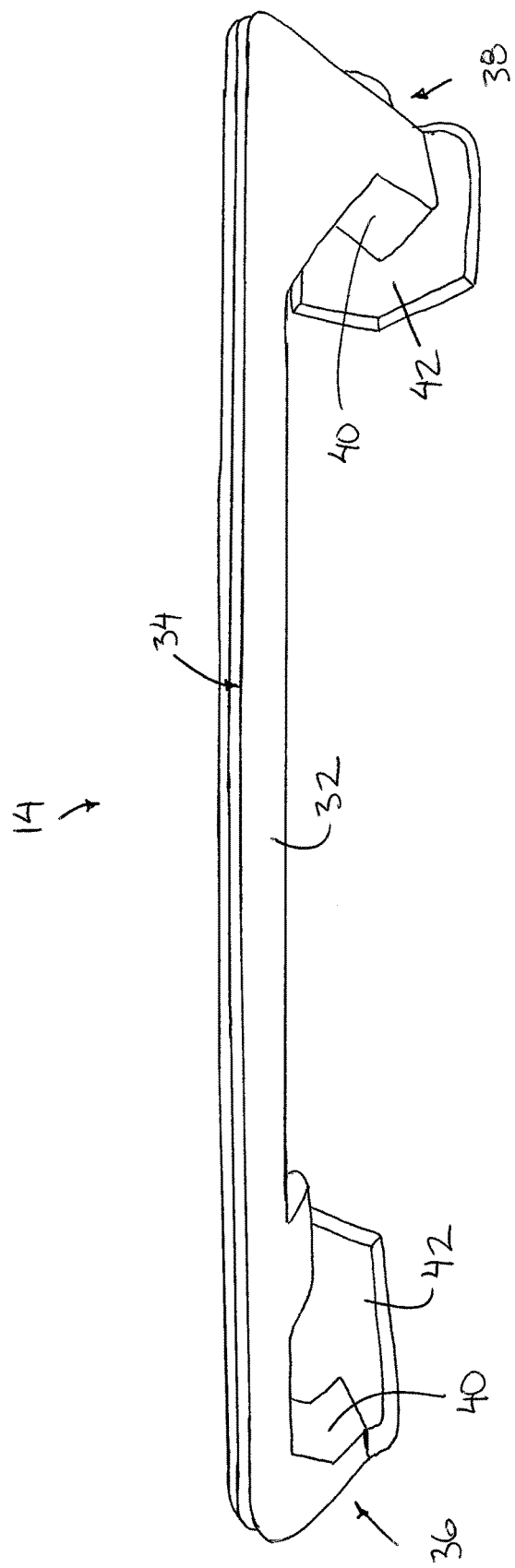
FIG. 4c is a perspective view of a bottom side of the blade mounting member.

FIG. 1 shows the current invention. FIG. 2 shows a lateral view of the current invention with the location of the blade holder component shown with a dashed line, as the blade holder component is encased in a composite material within the monocoque skate body. In one embodiment of the current invention the blade holder component is a molded nylon plastic piece. FIG. 3 shows an exploded view of the current invention. When assembled the toe cap is first stitched to the quarter panel then the combined component is bonded and stitched to the monocoque skate body. As can be noted from FIG. 3 and FIG. 4 the monocoque skate body does not cover the top of the toe box section and therefore the toe cap is required to provide protection to the top of the wearer's toe. FIG. 3 and FIG. 4 also show a bolt and hook system formed on the top of the skate blade that allow the skate blade to be removably attached to the blade holder component.

FIG. 4a is a cross sectional view of the monocoque skate body wherein one can see the location of the skate blade within the blade holder component, and the location of the blade holder component within the monocoque skate body. FIG. 4b shows the blade holder component as a stand-alone item.

Figure 5A:
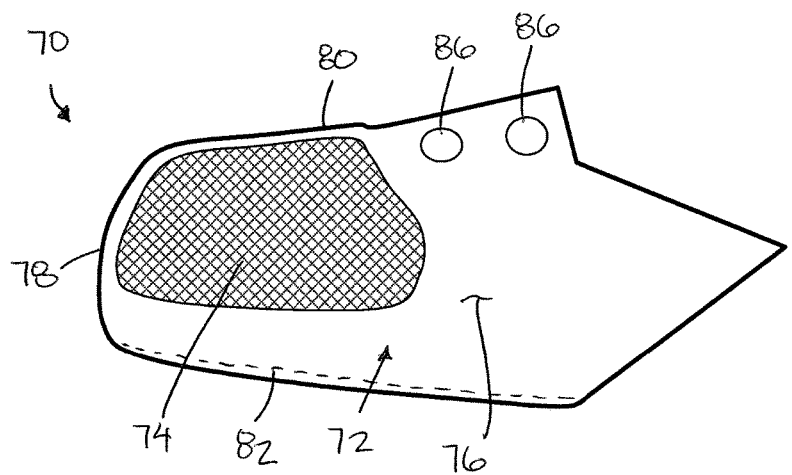
FIG. 5a is a side view of the toe cap.
Figure 5B:
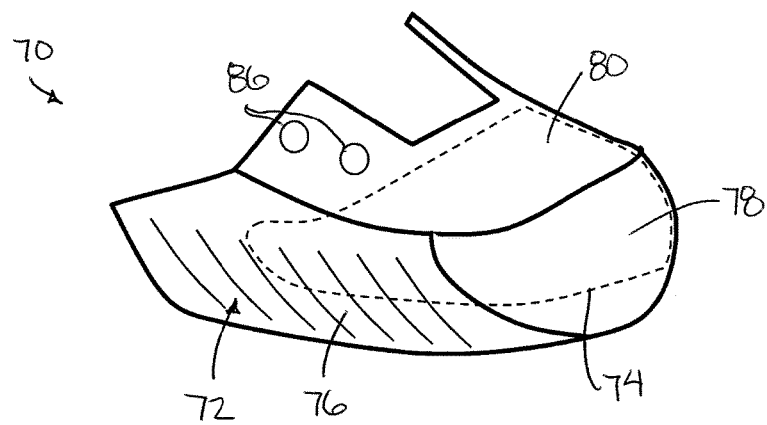
FIG. 5b is a perspective view of the toe cap.

FIG. 5a shows a cross section of the toe cap with a composite re-enforcing layer bonded to the inside surface of the toe cap. The composite material used in this section, which could be carbon fiber and the like, provides the necessary impact protection for the top and sides of the wearer's toes while adding minimal additional weight and thickness. FIG. 5b shows an alternate view of the toe cap with the composite re-enforcing layer shown with a dashed line.

Figure 6:
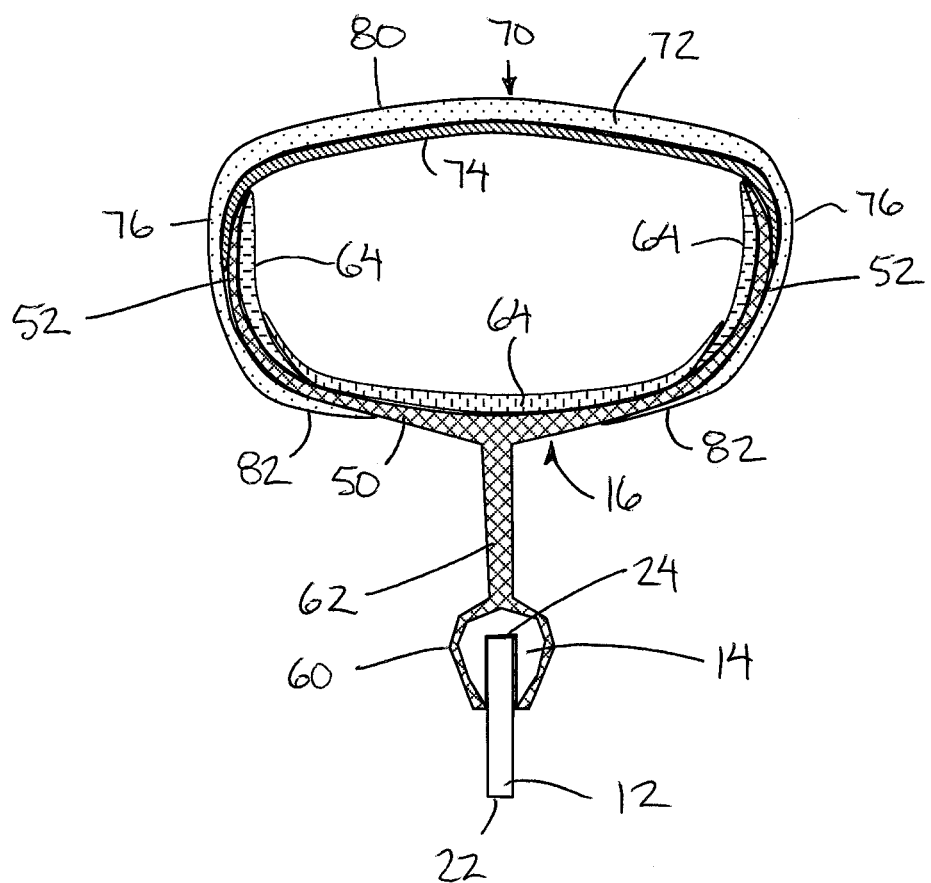
FIG. 6 is a sectional view through the line 6-6 of FIG. 2.

FIG. 6 shows the anterior cross sectional view from FIG. 2. Within this cross section you can see the toe cap, with the composite re-enforcing layer immediately underneath, encompassing the monocoque skate body, which can be comprised of woven composite materials such as carbon fiber and the like, but in an alternate embodiment the monocoque skate body could be comprised of a combination of thermo-form-able plastic and composite materials. FIG. 6 also shows how the composite material component of the monocoque skate body encases the blade holder component. FIG. 6 also shows the foam and liner component, which is adhered to the inner surface of the monocoque skate body, and the insole component, which sits on the bottom the monocoque skate body, and provides comfort to the wearer's foot.

Figure 7:
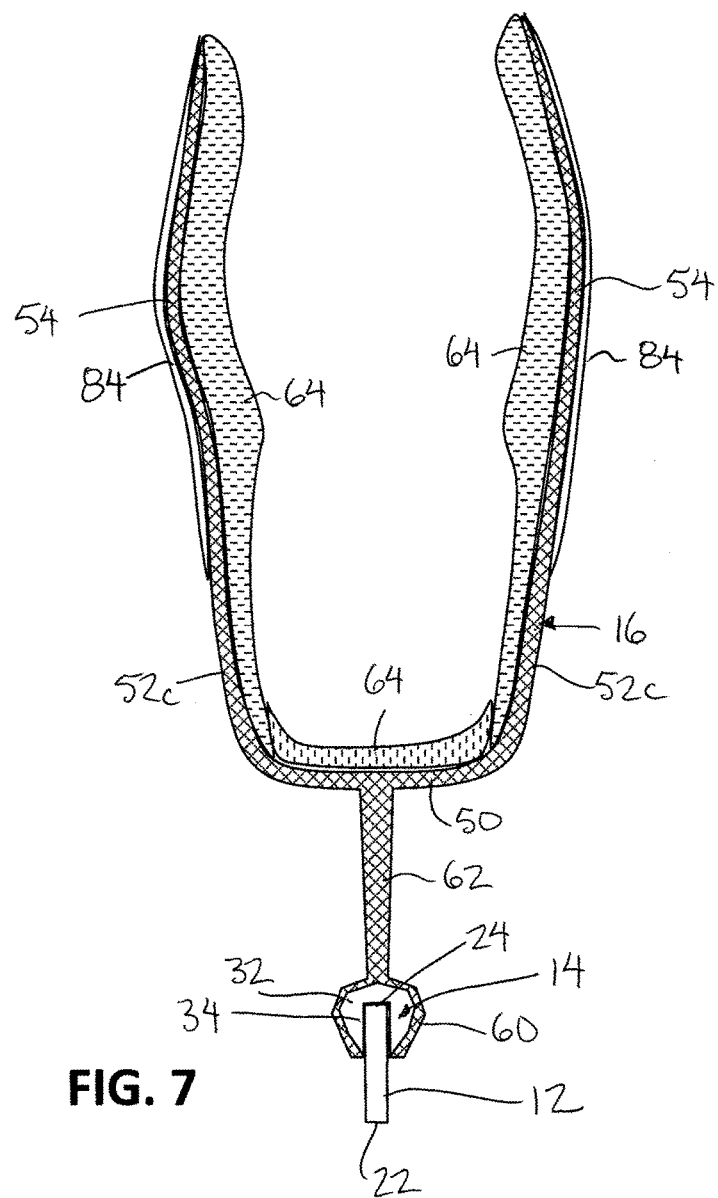
FIG. 7 is a sectional view through the line 7-7 of FIG. 2.
In the drawings like characters of reference indicate corresponding parts in the different figures.

FIG. 7 shows the posterior cross sectional view from FIG. 2.

Referring now more generally to all of the accompanying figures, there is illustrated a goalie skate assembly generally indicated by reference numeral 10. The goalie skate assembly generally includes a metal skate blade 12, a plastic blade mounting member 14 which is adapted to releasably mount the metal skate blade 12 therein, and a skate boot body 16 for receiving a foot of the user therein and for supporting the blade mounting member 14 relative to the foot of the user.

The skate blade 12 is cut from a plate of metal and is shaped so as to be elongate in a longitudinal direction from a front toe end 18 to a rear heel end 20 of the overall skate assembly. A bottom edge 22 of the skate blade is generally linear between the front and rear ends and is typically sharpened in the usual manner of a goalie hockey skate for engaging the surface of the ice.

An opposing top edge 24 of the skate blade is shaped to mate with the blade mounting member. More particularly the top edge 24 includes a hook portion 26 in proximity to the front end which protrudes upwardly beyond the remainder of the skate blade so as to be sloped upwardly and rearwardly. The hook portion meets with a corresponding socket provided in the blade mounting member as described in further detail below. The top edge 24 also includes a fastener portion 28 in proximity to the rear end which protrudes upwardly and is coupled to a retainer bolt 30 that is used for securing the blade to the blade mounting member as described in further detail below. Opposing sides of the plate of metal from which the skate blade is cut define the two opposing flat sides of the skate blade which in turn define the overall thickness of the skate blade.

The blade mounting member 14 is a moulded plastic body including a channel portion 32 which is generally U-shaped in cross section and which is elongate in the longitudinal direction to extend substantially the full length of the blade between the front toe end and the rear heel end. The cross-section of the channel portion 32 defines a bottom groove 34 therein open to the bottom side for receiving the skate blade therein. The width of the groove 34 corresponds to the thickness of the skate blade while the vertical depth or height of the groove is equal to only a portion of the overall height of the skate blade between the top and bottom edges thereof such that abutment of the top edge of the blade against the inner end of the groove ensures that a lower portion of the blade remains protruding downwardly beyond the bottom side of the blade mounting member.

A socket portion 35 communicates with the inner end of the bottom groove 34 at a location in proximity to the front end of the blade mounting member for alignment with the hook portion 26 of the skate blade when the skate blade is received within the blade mounting member. The socket portion 35 accordingly extends at an upward and rearward slope from the inner end of the groove, corresponding to the orientation of the hook portion 26 for snugly receiving the hook portion therein in the mounted position of the skate blade.

The blade mounting member further includes a front support column 36 extending upwardly from the channel portion 32 in proximity to the front end of the blade mounting member and a rear support column extending upwardly from the channel portion in proximity to the rear end of the blade mounting member. Each support column extends substantially the full height between the channel portion, spaced below the sole portion of the boot body, and the bottom side of the sole portion of the boot body. Each support column includes a main portion 40 having a width which is near to the width of the channel portion 32 in the lateral direction and which spans most of the height of the support column, and a top portion 42 mounted at the top end of the main portion in the form of a generally flat plate arranged to be mounted substantially parallel to the flat bottom of the sole portion of the boot body. The top portion 42 is wider than the main portion in the lateral direction as well as being longer than the corresponding dimension of the support column in the longitudinal direction.

The rear support column 38 includes a bore 44 which extends at a downward and forward slope from an open and at the rear side of the support column to an internal end in communication with the bottom groove 44 in alignment with the fastener portion 28 of the skate blade. The bore 44 is thus adapted to receive the retainer bolt 30 axially therethrough such that a suitable nut 46 can be threaded onto the rear end of the bolt 30 and received within a counter bore 48 at the rear end of the bore 44.

The skate blade is thus mounted within the blade mounting member by initially aligning the hook portion 26 of the skate blade with the socket portion 35 in the blade mounting member, and aligning the retainer bolt 30 with the bore 44. The main portion of the skate blade is then displaced upwardly and rearwardly into the bottom groove 34 of the blade mounting member according to the slope of the hook portion received within the socket portion until the majority of the top edge of the skate blade abuts the internal end of the groove. Securement of the nut 46 to the end of the retainer bolt 30 retains the skate blade mounted within the bottom groove of the blade mounting member.

The skate boot body 16 is a unitary, monocoque structure formed of a carbon fibers and resin composite material. The skate boot body includes a sole portion 50, two side portions 52, two ankle portions 54, a toe portion 56, a heel portion 58, and a lower portion 60 extending downward below the sole portion for mounting the blade mounting member relative to the remainder of the skate boot body.

The sole portion 50 comprises a generally flat bottom of the resulting foot receiving cavity of the skate boot body. More particularly the sole portion 50 extends longitudinally substantially the full length of the skate boot body between the heel end and the toe end of the skate assembly for receiving the foot of the user on the top side thereof. The sole portion 50 supports the lower portion 60 protruding downwardly from the bottom side thereof.

The two side portions 52 protrude upwardly from the opposing inner and outer sides of the sole portion 50 that extend in the longitudinal direction. The side portions extend upwardly from the sole portion along substantially the full length between the heel and toe ends for receiving the majority of the foot of the user laterally between the two side portions. Each side portion 52 includes a forward portion 52a adjacent the toe end of the sole portion so that the toes of the user are received laterally between the two forward portions. Each side portion also includes a mid portion 52b extending upwardly to a height of the eyelets of the finished skate boot so as to be adapted to extend up to the height of the midfoot region of the user. Each side portion also includes a rear portion 52c extending upwardly in proximity to the rear end of the sole portion up to the ankle portions 54 thereabove which are adapted to span over the ankles of the user.

The toe portion 56 comprises a lip protruding upwardly from the front end of the sole portion between the two side portions so as to extend only part of the height of the toes of a foot of the user by extending upwardly only part of the height of the resultant toe box of the skate assembly.

The heel portion 58 of the skate boot body is generally cup-shaped between the rear ends of the two side portions 52 so as to extend upwardly from the heel end of the sole portion for receiving the heel of the user therein.

The lower portion 60 of the skate boot body extends downwardly from the bottom side of the sole portion to fully surround the external surfaces of the top and main portions of each support column as well as fully surrounding the exterior surfaces of the channel portion 32.

The lower portion 60 also includes a web portion 62 forming a planar sheet spanning the space between the front and rear support columns between the channel portion therebelow and the bottom side of the sole portion of the skate boot body thereabove. One or more openings may be formed in the web portion 62 to reduce weight as may be desired. Only the rear opening of the fastener bore 44 and the bottom opening groove 34 of the blade mounting body remain exposed for access of the skate blade into and out of the blade mounting member in use.

A cushioning boot liner 64 is provided within the skate boot body in the form of cushioning material which is bonded to the inner surfaces of the skate boot body. Suitable materials include resilient foam, leather, or other comparable cushioning materials commonly used in footwear. More particularly the cushioning boot liner 64 lines the sole portion, both side portions, the ankle portions, and the heel portion of the skate boot body. Typically the liner 64 includes an insole portion formed separately from the remainder of the liner.

A toe cap 70 is manufactured separately from the skate boot body for subsequent attachment to the skate boot body when assembling the goalie skate assembly. The toe cap 70 includes an outer shell 72 moulded of plastic material which defines the outer dimensions of a resultant toe box of the skate assembly for receiving the toes of the foot of the user therein, and a toe liner 74 formed of a carbon fibers and resin composite material bonded to an inner surface of the outer shell 72.

The outer shell 72 of the toe cap includes two side portions 76 forming two upright sides at laterally opposed sides of the toe cap, a front portion 78 joined between the two side portions at the front end thereof for extending upwardly from the toe end of the sole portion and the assembled condition, and an upper portion 80 spanning rearwardly from the top end of the front portion 78 to extend laterally between the two opposing side portions 76 at the top ends thereof. The outer shell also includes two lower flanges 82 protruding inwardly from the bottom edges of the two side portions 76 towards one another for overlapping the bottom side of the sole portion of the skate boot body in a mounted position. Inner ends of the two lower flanges 82 remain laterally spaced apart for receiving the front support column 36 of the blade mounting member extending therethrough.

The toe liner 74 is bonded to the inner surface of each of the front portion 78, the upper portion 80, and the majority of the side portions 76. The toe cap 70 is mounted onto the skate boot body such that the portion of the toe liner lining the front portion 78 of the outer shell overlaps the outer side of the toe portion 56 of the boot body and the portion of the toe liner lining the side portions of the outer shell overlaps the outer sides of the forward portions 52a of the two side portions of the skate boot body.

Two quarter panel extensions 83 are mounted to the two side portions of the outer shell of the toe cap so as to overlap the two side portions by abutting the panel extensions against the inner surfaces of the two side portions. The toe cap 70 is then mounted in overlapping arrangement with outer surfaces of the skate boot body.

Two finishing side panels 84, for example two cut pieces of leather, are mounted against the outer surfaces of respective portions of the side portions of the skate boot body by bonding and stitching. The finishing side panels 84 overlap the exterior of the extension panels 83 in proximity to the rear edges thereof as well as overlapping the two ankle portions upwardly and rearwardly thereof. Upper edges of the two finishing side panels align with the upward edges of the mid-portions 52b and the forward edges of the ankle portions respectively.

A row of the eyelet holes 86 are provided within the finishing side panels 84 for alignment with respective eyelet holes along the upper edges of the side portions of the skate boot body. The two side panels of the outer shell of the toe cap each locate two forwardmost eyelet holes 86 of the skate boot body therein and an additional eyelet hole 86 is located in each extension panel 83, also for alignment with corresponding eyelet holes in the skate boot body.

The skate boot further includes a tongue 88 formed of a flexible cushioning material which is joined at a forward end to the upper portion of the toe cap to extend upwardly and rearwardly therefrom. The tongue spans over the top of the foot of the user and spans laterally between the top edges of the two side portions 52 of the skate boot body.

Manufacturing of the skate boot assembly begins by providing a foot last which may be a generically sized model, or may be a customized foot last which is created by 3-D scanning a foot of the user and 3-D printing a corresponding representation of the foot of the user for example.

The foot last is initially covered with the boot liner 64, including a sole portion, side portions, and a heel portion for subsequently lining all interior surfaces of the skate boot body. The blade mounting member is then positioned relative to the boot liner 64 by abutting the flat plates forming the top portions of the front and rear support column against the bottom side of the sole portion of the boot liner.

Wet composite material of carbon fibers and uncured resin are then layered over top of the boot liner 64 about the foot last to fully cover the blade mounting member and form the foot receiving cavity of the skate boot body as a single unitary structure. A vacuum bag is applied over top of the uncured composite material which is then heated with a vacuum applied to the bag until the wet composite material has cured into a rigid composite structure matrix defining the resulting monocoque structure of the skate boot body with the liner 64 and the blade mounting member integrated therein. The cured composite material forms the sole support of the blade mounting member relative to the remainder of the skate boot body. The foot last can then be removed from the cured skate boot body.

Any composite material covering the bottom groove of the blade mounting member can be cut away to ensure that the bottom groove remains accessible for receiving the skate blade therein.

The outer shell of the toe cap 70 is moulded of a plastic material which is tough and provides suitable resistance to cracking as it provides the predominant support structure of the toe cap. Subsequent to the moulding of the outer shell, composite material is applied in a wet and uncured state to the corresponding inner surfaces of the outer shell such that subsequent curing of the toe liner 64 provides sufficient bonding of the composite material to the inner surface of the outer shell. The cured toe liner has a greater hardness than the plastic material of the outer shell to increase the impact resistance of the outer shell. The toe cap can then be mounted onto the remainder of the skate boot body by bonding between overlapping surfaces, stitching, and/or rivets through the lower flanges of the toe cap and the overlapped portions of the sole portion of the boot body.

The finishing side panels are subsequently overlaid on the opposing inner and outer sides of the skate boot body and attached by bonding and/or stitching.

A tongue can be joined to the toe cap by various means.

Since various modifications can be made in my invention as herein above described, and many apparently widely different embodiments of same made, it is intended that all matter contained in the accompanying specification shall be interpreted as illustrative only and not in a limiting sense.

The invention claimed is:

1. A goalie skate assembly for use with a metal skate blade, the assembly comprising:
    a skate boot body for receiving a foot of a user therein; and
    a blade mounting member formed of a first material having a channel portion spanning a length of the blade mounting member and defining a bottom groove formed therein which is adapted to releasably receive the metal skate blade therein and a mounting portion extending upwardly from the channel portion for attachment to the skate boot body;
    the skate boot body comprising a sole portion extending longitudinally between a heel end and a toe end for receiving the foot of the user thereon, a heel portion extending upwardly from the sole portion for receiving a heel of the user therein, a pair of side portions extending upwardly from opposing longitudinally extending sides of the sole portion for receiving a portion of the foot of the user therebetween, and a lower portion extending downwardly from the sole portion for connection to the blade mounting member;
    wherein the lower portion, the sole portion, the heel portion and the side portions of the skate boot body comprise a unitary, monocoque structure integrally formed of a second material different than the first material;
    wherein the lower portion of the skate boot body surrounds at least a portion of the mounting portion of the blade mounting member, such that the first material of said at least a portion of the mounting portion of the blade mounting member is encased by the second material of said skate boot body and the blade mounting member; and
    wherein the mounting portion of the blade mounting member is structurally retained relative to the skate boot body by the first material of said at least a portion of the mounting portion of the blade mounting member being encased by the second material of said skate boot body and the blade mounting member.

2. The goalie skate assembly according to claim 1 wherein the first material of the blade mounting member comprises plastic material.

3. The goalie skate assembly according to claim 1 wherein the second material of the skate boot body comprises a fibre and resin composite material.

4. The goalie skate assembly according to claim 3 wherein the fibre and resin composite material comprises carbon fibres.

5. The goalie skate assembly according to claim 1 wherein the mounting portion comprises a pair of support columns extending upwardly towards the sole portion from the channel portion at longitudinally spaced positions, wherein at least a portion of the support columns are encased by the second material of the skate boot body.

6. The goalie skate assembly according to claim 1 wherein the skate boot body includes an integral liner bonded to an inner surface thereof, the mounting portion of the blade mounting member being abutted at respective upper ends with the integral liner of the skate boot body.

7. The goalie skate assembly according to claim 1 wherein the blade mounting member and the channel portion are fully encased by the second material of the skate boot body such that the blade mounting member is structurally retained relative to the skate boot body solely by the second material of the lower portion of the skate boot body encasing said at least a portion of the blade mounting member.

8. The goalie skate assembly according to claim 1 wherein the skate boot body includes two ankle portions for spanning over respective ankles of the foot of the user.

9. The goalie skate assembly according to claim 1 wherein the side portions of the skate boot body include respective forward portions extending upwardly from the opposing longitudinally extending sides of the sole portion at the toe end of the sole portion such that the skate boot body does not cover a top of a toe box section of the skate boot body that receives toe of the foot of the user therein.

10. The goalie skate assembly according to claim 1 further comprising a toe cap including an outer shell having a pair of upright side portions at the opposing longitudinally extending sides of the sole portion, a front portion joined between the side portions to extend upwardly from the toe end of the sole portion, and an upper portion joined between the side portions at a location spaced above the sole portion so as to define a toe box for receiving toes of the foot of the user therein.

11. The goalie skate assembly according to claim 10 wherein the outer shell is formed of plastic material and wherein the goalie skate assembly further comprises a liner formed of a fibre and resin composite material bonded to at least a portion of an inner surface of the outer shell.

12. A skate assembly comprising:
   a skate boot body including a sole portion extending longitudinally between a heel end and a toe end for receiving a foot of a user thereon, a heel portion extending upwardly from the sole portion for receiving a heel of the user therein, pair of side portions extending upwardly from opposing longitudinally extending sides of the sole portion for receiving a portion of the foot of the user therebetween, wherein the sole portion, the heel portion and the side portions of the skate boot body comprise a unitary, monocoque structure integrally formed of a fibre and resin composite material;
   a blade mounting member extending downwardly from the sole portion which is adapted to mount a skate blade therein; and
   a toe cap mounted on the toe end of the skate boot body comprising an outer shell formed of molded plastic and a toe liner separate from the monocoque structure of the skate boot body formed of a fibre and resin composite material bonded to at least a portion of an inner surface of the outer shell.

13. The goalie skate assembly according to claim 12 wherein the toe liner is bonded to the inner surface of at least a section of each of the side portions, the front portion and the upper portion of the toe cap.

14. The goalie skate assembly according to claim 12 wherein the toe liner of the toe cap overlaps a portion of an exterior side of each side portion of the skate boot body at each of the opposing longitudinally extending sides of the sole portion.

15. The assembly according to claim 12 wherein the outer shell of the toe cap includes a pair of upright side portions at the opposing longitudinally extending sides of the sole portion, a front portion joined between the side portions to extend upwardly from the toe end of the sole portion, and an upper portion joined between the side portions at a location spaced above the sole portion so as to define a toe box for receiving toes of the foot of the user therein, and wherein the liner is bonded to the inner surface of at least a section of each of the side portions, the front portion and the upper portion of the toe cap.

16. The assembly according to claim 12 and wherein the toe liner of the toe cap overlaps a portion of an exterior side of each side portion of the skate boot body at each of the opposing longitudinally extending sides of the sole portion.

17. A method of fabricating a skate boot body for a skate boot in which the skate boot body includes a sole portion extending longitudinally between a heel end and a toe end for receiving a foot of a user thereon, a heel portion extending upwardly from the sole portion for receiving a heel of the user therein, pair of side portions extending upwardly from opposing longitudinally extending sides of the sole portion for receiving a portion of the foot of the user therebetween, wherein the sole portion, the heel portion and the side portions of the skate boot body are integrally formed with one another as a unitary, monocoque structure, the method comprising:
   (a) providing a foot last;
   (b) positioning a cushioning boot liner, adapted to cushion the foot of the wearer in the skate boot body, on the foot last;
   (c) positioning a blade mounting member, having a bottom groove formed therein which is adapted to releasably receive a metal skate blade therein, on a bottom side of the boot liner;
   (d) layering wet composite material over said boot liner portion and over said blade mounting member; and
   (e) vacuum bagging and heating the wet composite material until the wet composite material has cured into a rigid composite structure matrix defining the unitary, monocoque structure of the skate boot body with said boot liner and said blade mounting member integrated therein.

18. The method according to claim 17 including re-positioning the blade mounting member relative to the foot last according to a preference of the user.

19. The method according to claim 17 wherein the blade mounting member is formed of plastic material.

20. The method according to claim 17 including forming a toe cap by molding an outer shell of the toe cap of plastic material and subsequently lining the outer shell with a toe liner formed of fibre and resin composite material, and mounting the toe cap onto the toe end of the skate boot body such that the toe liner of the toe cap overlaps an exterior side of each side portion of the skate boot body at each of the opposing longitudinally extending sides of the sole portion.

* * * * *